US012648054B2

(12) United States Patent
Ock

(10) Patent No.: US 12,648,054 B2
(45) Date of Patent: Jun. 2, 2026

(54) PLANAR HEATING COMPOSITE SHEET

(71) Applicant: INNOROAD CORP., Suwon-si (KR)

(72) Inventor: Changkwon Ock, Suwon-si (KR)

(73) Assignee: INNOROAD CORP., Suwon-si (KR)

( * ) Notice: Subject to any disclaimer, the term of this patent is extended or adjusted under 35 U.S.C. 154(b) by 653 days.

(21) Appl. No.: 18/250,736

(22) PCT Filed: Dec. 7, 2020

(86) PCT No.: PCT/KR2020/017723
§ 371 (c)(1),
(2) Date: Apr. 26, 2023

(87) PCT Pub. No.: WO2022/045473
PCT Pub. Date: Mar. 3, 2022

(65) Prior Publication Data

US 2024/0023206 A1 Jan. 18, 2024

(30) Foreign Application Priority Data

Aug. 31, 2020 (KR) ........................ 10-2020-0109933

(51) Int. Cl.
*H05B 3/36* (2006.01)
*H05B 3/14* (2006.01)

(52) U.S. Cl.
CPC ............... *H05B 3/36* (2013.01); *H05B 3/145* (2013.01); *H05B 2203/013* (2013.01); *H05B 2214/02* (2013.01); *H05B 2214/04* (2013.01)

(58) Field of Classification Search
CPC ..... H05B 3/36; H05B 3/145; H05B 2203/013
See application file for complete search history.

(56) References Cited

U.S. PATENT DOCUMENTS 10,397,983 B2 * 8/2019 Fortenbacher ........... H05B 3/58
12,424,372 B2 * 9/2025 Goldman ................ H01F 17/03

FOREIGN PATENT DOCUMENTS

CN 1663002 A 8/2005
CN 111021180 A 4/2020
(Continued)

OTHER PUBLICATIONS

JP 2584592 English Translation (Year: 2026).*
(Continued)

*Primary Examiner* — Woody A Lee, Jr.
(74) *Attorney, Agent, or Firm* — BROADVIEW IP LAW, PC

(57) ABSTRACT

The present embodiment relates to a planar heating composite sheet including: a planar heating layer including a base sheet having a predetermined width and length, a plurality of electrodes coated to an upper surface of the base sheet along a width direction of the base sheet, with different polarities being alternately arranged at regular intervals along a length direction of the base sheet, a conductive paste coated entirely between the plurality of electrodes on the upper surface of the base sheet and generating heat by electrical resistance, and an insulating sheet made of a synthetic resin material and attached to an upper portion of the conductive paste; and a heat insulating layer including a heat insulating sheet attached to a lower portion of the planar heating layer and including a non-woven fabric impregnated with aerogel, and a protective sheet made of a synthetic resin material.

6 Claims, 7 Drawing Sheets

(56) References Cited

FOREIGN PATENT DOCUMENTS

| | | | | | |
|---|---|---|---|---|---|
| GB | 2537214 | A | * | 10/2016 | ............... H05B 3/12 |
| JP | 07312277 | A | | 11/1995 | |
| JP | 2584592 | B2 | * | 2/1997 | |
| JP | 10199660 | A | | 7/1998 | |
| JP | H11283732 | A | * | 10/1999 | |
| JP | 2019108617 | A | | 7/2019 | |
| KR | 20-2007-0000538 | U | | 5/2007 | |
| KR | 101338024 | B1 | * | 12/2013 | ............... H05B 3/03 |
| KR | 20150009795 | A | | 1/2015 | |
| KR | 20170056117 | A | * | 5/2017 | ............... H05B 3/34 |
| KR | 20170061878 | A | | 6/2017 | |
| KR | 20180115378 | | * | 10/2018 | |
| KR | 20180115378 | A | * | 10/2018 | ............... H05B 3/14 |

OTHER PUBLICATIONS

KR 20180115378 (Year: 2018).*
Office Action for CN 202080106782.0 by China National Intellectual Property Administration dated Feb. 24, 2025.
Shi, Li Yi et al., "Wonderful porous material microstructure Year of LITE book series," Shanghai Popular Science Press, Jan. 2018.
Office Action for CN 202080106782.0 by China National Intellectual Property Administration dated Sep. 11, 2024.
International Search Report for PCT/KR2020/017723 by Korean Intellectual Property Office dated May 24, 2021.
Office Action for CN 202080106782.0 by China National Intellectual Property Administration dated Aug. 13, 2025.

* cited by examiner

PLANAR HEATING COMPOSITE SHEET

CROSS-REFERENCE TO RELATED APPLICATIONS

This application is a National Phase Entry Application of PCT Application No. PCT/KR2020/017723 filed on Dec. 7, 2020, which claims priority to Korean Patent Application No. 10-2020-0109933 filed on Aug. 31, 2020, in Korean Intellectual Property Office, the entire contents of which are hereby incorporated by reference in its entirety.

TECHNICAL FIELD

The present invention relates to a planar heating composite sheet, and more particularly, to a planar heating composite sheet capable of preventing loss of heat in a downward direction more efficiently, and allowing more heat transfer in an upward direction through uniform planar heating, and having a structure so as to prevent damages due to application of asphalt concrete or equipment load during snow melting pavement construction or due to application of wheel load after construction more efficiently.

BACKGROUND ART

Generally, the slip accidents due to ice on the road in winter account for high proportion of the traffic accidents that occur on roads, and particularly, the accident frequency is high in steep slopes, overpasses, and tunnel entrances and exits which are habitual freezing areas.

Human casualties and enormous property damages by large and small traffic accidents caused by road surface freezing in winter are increasing every year.

In addition, the initial work is very important in the snow removal work for the snowfall, but, when access to the site is already difficult due to freezing, the snow removal work is relatively delayed, and risk of severe traffic congestion and traffic accidents greatly increases Meanwhile, the weak snow will have the snow melting effect over time, but in most cases, there is no fundamental measure against snow falling and freezing on the road surface during the transitional period of the snow melting process after snowfall and a sudden drop in the minimum temperature at night.

As the easiest means for preventing this, spraying calcium chloride as a snow removal agent using a snow removal vehicle is widely used, but damages to road facilities such as corrosion and other various negative effects this has on the environment are blamed as the serious problems by the environmental groups and road officials.

Therefore, an eco-friendly snow removal method is demanded, which can prevent the life threats and enormous economic losses that increase every year due to confusing traffic accidents of drivers driving on the road in winter, by applying more immediate and efficient snow removal methods, in combination with the initial response to snowfall on steep slopes, overpasses, and tunnel entrances and exits which are vulnerable to snow falling and freezing in winter.

According to the above requirements, in the related art, a method of burying, on the surface of the road, a heating medium in the form of a heating net in which heating cables are arranged in a staggered pattern on a metal frame in the form of mesh, and melting snow on the road using the heat emitted from the heating cables has been proposed.

However, the method mentioned above has shortcomings. That is, most of heat emitted from the heating cables is transferred downward and lost in the ground, thus taking relatively longer time to transfer heat to the surface of the road, and amount of transferred heat is insufficient to ensure proper snow melting of the road.

The above problem occurs because, while the general thickness of the asphalt concrete pavement layer of the road pavement is 20 to 40 cm, the heating cable is buried 5 to 10 cm from the surface of the asphalt concrete pavement layer, and accordingly, the heat generated from the heating cables tends to move to the lower portion that has a higher heat capacity than the upper portion.

In addition, the heating net as described above has a problem in that maintenance costs increase due to frequent re-construction as the heating cables are damaged and lose their function by the asphalt concrete or equipment load applied during construction and the wheel load applied after construction.

Accordingly, as shown in FIG. 1, recently, the linear heating method has been mainly used, which includes: forming a groove 200 having a predetermined depth and length from the surface of the road; installing, within the groove 200 and in order, an insulator 300 for preventing loss of heat to the lower portion, a receiving member 400 for accepting a heating cable 500 and made of metal with excellent thermal conductivity, and a fixing member 600 for fixing upper ends of the heating cable 500 and the receiving member 400; and then forming a thermal conductive layer 700 filled with a thermal conductive resin solution on an upper portion of the receiving member 400.

The linear heating method described above provides greatly improved efficiency of melting snow on the road, since loss of heat into the ground is prevented through the insulator 300 placed on the lower portion, and most of the heat emitted from the heating cable 500 is rapidly transferred to the road surface through the thermally conductive receiving member 400 and the thermal conductive layer 700.

However, the method described above has a problem in that it requires to perform a number of operations, including an operation of forming a plurality of grooves 200 having a predetermined depth and length on the road, an operation of removing dust in the grooves 200, an operation of installing the heat insulating material 300 in the grooves 200, an operation of installing the receiving member 400 on an upper portion of the heat insulating material 300, an operation of installing the heating cable 500 in the receiving member 400, an operation of installing the fixing member 600 for fixing the upper portion of the receiving member 400, and an operation of filling the upper portion of the receiving member 400 with the thermal conductive resin solution for forming the thermal conductive layer 700, thus making the installation work cumbersome and requiring a lot of time for the installation operation.

In addition, the problem that the heat emitted from the heating cable is lost in the process of being transferred to the road surface down to the lower portion through the sides of the receiving member 400 and the thermal conductive layer 700 has not been solved.

DETAILED DESCRIPTION OF INVENTION

Technical Problem

The present invention has been suggested to solve the above problems, and an object of the present invention is to provide a planar heating composite sheet capable of preventing loss of heat in a downward direction more efficiently, and allowing more heat transfer in an upward direction through uniform planar heating, and having a structure so as to prevent damages due to application of asphalt concrete or equipment load during snow melting pavement construction or due to application of wheel load after construction more efficiently.

Technical Solution

According to one aspect of the present invention for achieving the above object, a planar heating composite sheet is provided, which may include: a planar heating layer including a base sheet made of a synthetic resin material and having a predetermined width and length, a plurality of electrodes coated to an upper surface of the base sheet along a width direction of the base sheet, with different polarities being alternately arranged at regular intervals along a length direction of the base sheet, a conductive paste coated entirely between the plurality of electrodes on the upper surface of the base sheet and generating heat by electrical resistance, and an insulating sheet made of a synthetic resin material and attached to an upper portion of the conductive paste; and a heat insulating layer including a heat insulating sheet attached to a lower portion of the planar heating layer and including a non-woven fabric impregnated with aerogel, and a protective sheet made of a synthetic resin material and attached to a lower part of the non-woven fabric sheet.

In an example, a thickness of the heat insulating layer may be 1 to 5 mm.

Further, the conductive paste 13 may include 20 to 40 parts by weight of amorphous co-polyester resin as a binder, 2.5 to 7.5 parts by weight of carbon nanotubes, and 2.5 to 7.5 parts by weight of carbon nanoplates, and the balance being graphene, silver (Ag) powder, a carbon dispersant and a solvent.

Meanwhile, the carbon dispersant may use, in combination, at least two or more of carboxymethyl cellulose, polystyrene sulfonate, chondroitin sulfate, and hyaluronic acid.

Further, a protective layer may be further provided, which may be attached to an upper portion of the planar heating layer and to a lower portion of the heat insulating layer, and include a non-woven fabric of synthetic resin material impregnated with asphalt and rubber.

Further, during a snow melting pavement construction of a road, the electrodes of the same polarity of each adjacent planar heating layer may be directly connected with each other with a conductive wire.

Advantageous Effects

According to the present invention as described above, the loss of heat into the ground is prevented more efficiently such that the heat transfer efficiency in the upward direction is greatly improved, and accordingly, when applied to the snow melting pavement of the road, the snow melting efficiency is remarkably improved, and subsequently, the power consumption can also be greatly reduced.

Further, the present invention can reduce maintenance costs of re-construction as damages caused by asphalt concrete or equipment load applied during snow melting pavement construction and wheel load applied after construction can be prevented more efficiently.

DETAILED DESCRIPTION FOR EMBODYING INVENTION

Figure 1:
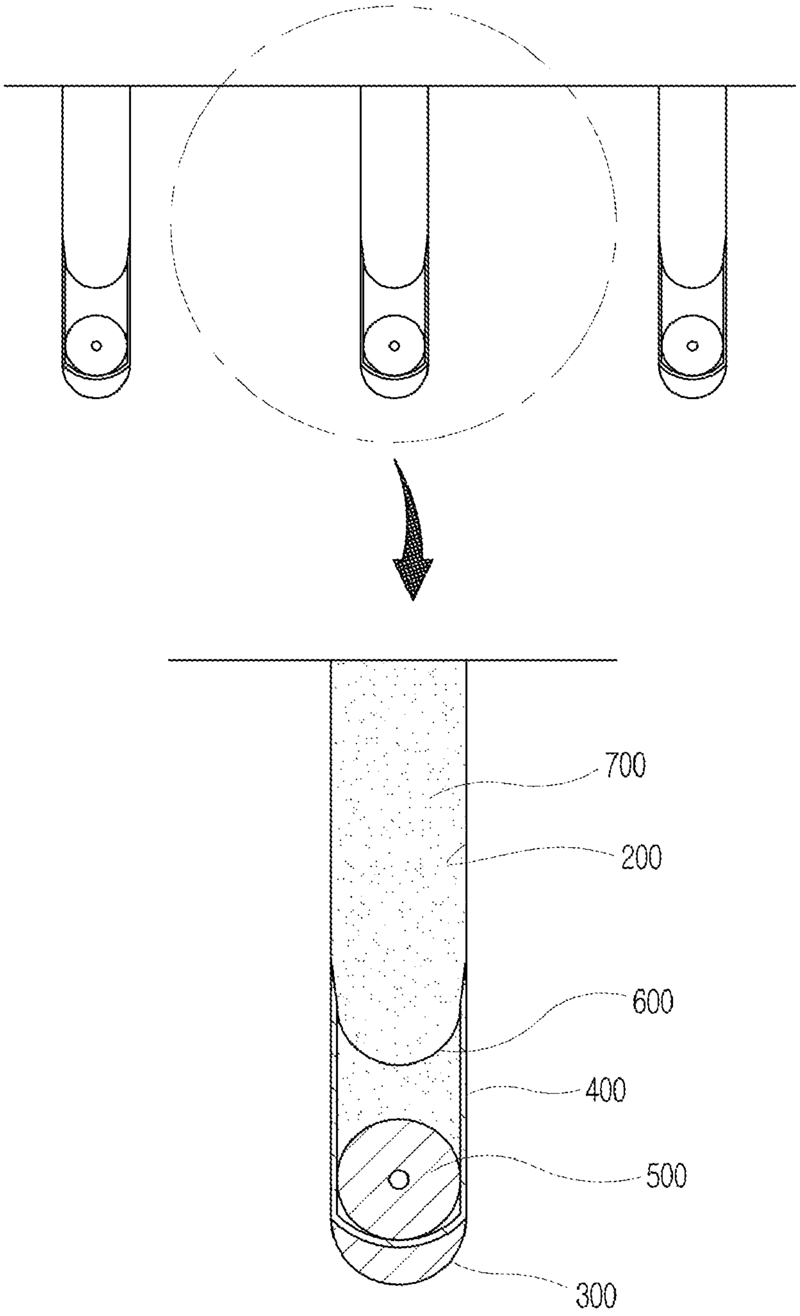
FIG. 1 schematically illustrates a conventional snow melting pavement in a state of being installed in a road.

Hereinafter, the present invention will be described in more detail with reference to the drawings. It should be noted that the same elements in the drawings are denoted by the same reference numerals wherever possible. In addition, detailed descriptions of the well-known functions and configurations that may unnecessarily obscure the subject matter of the invention will be omitted.

Figure 2:
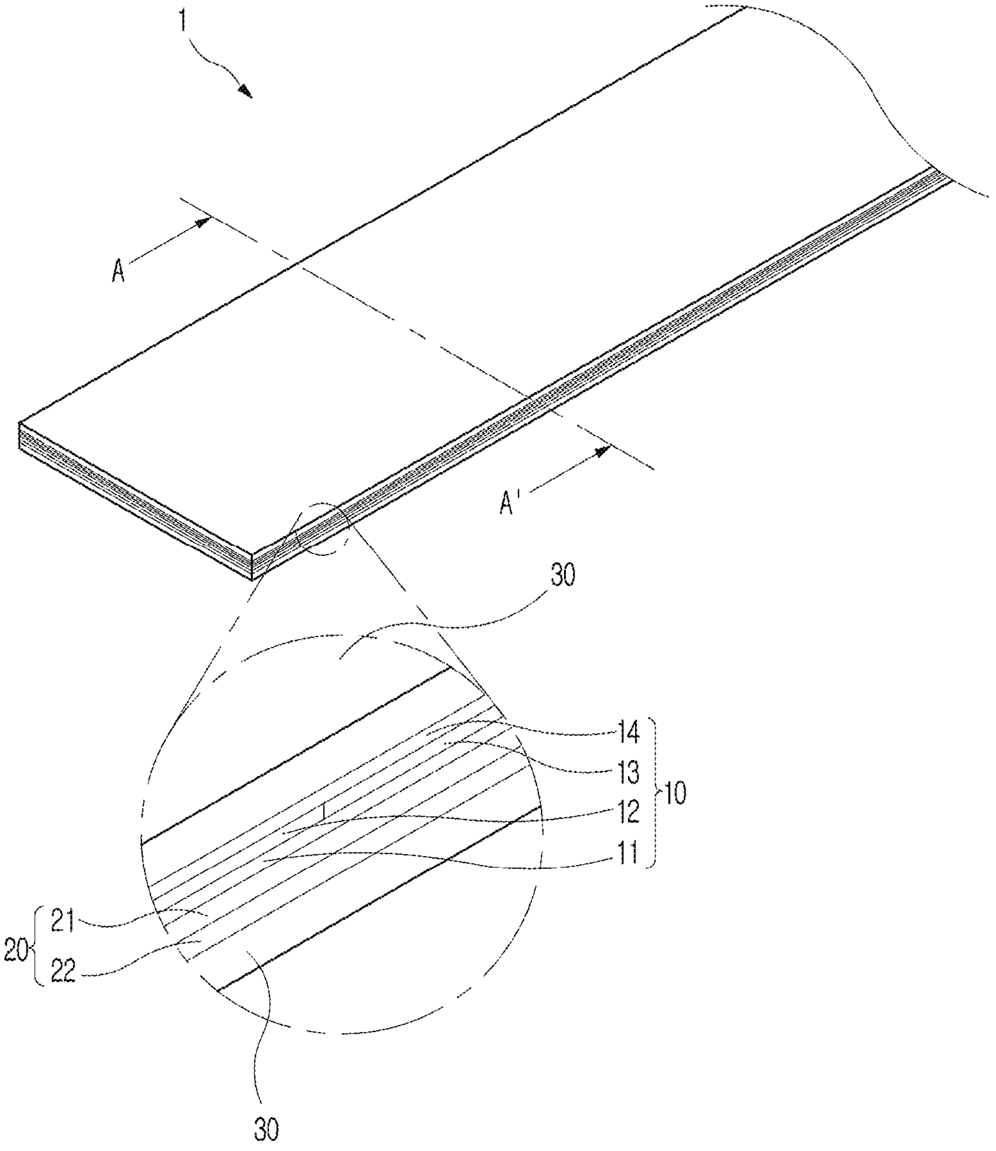
FIG. 2 is a perspective view of a planar heating composite sheet according to an embodiment of the present invention.
Figure 3:
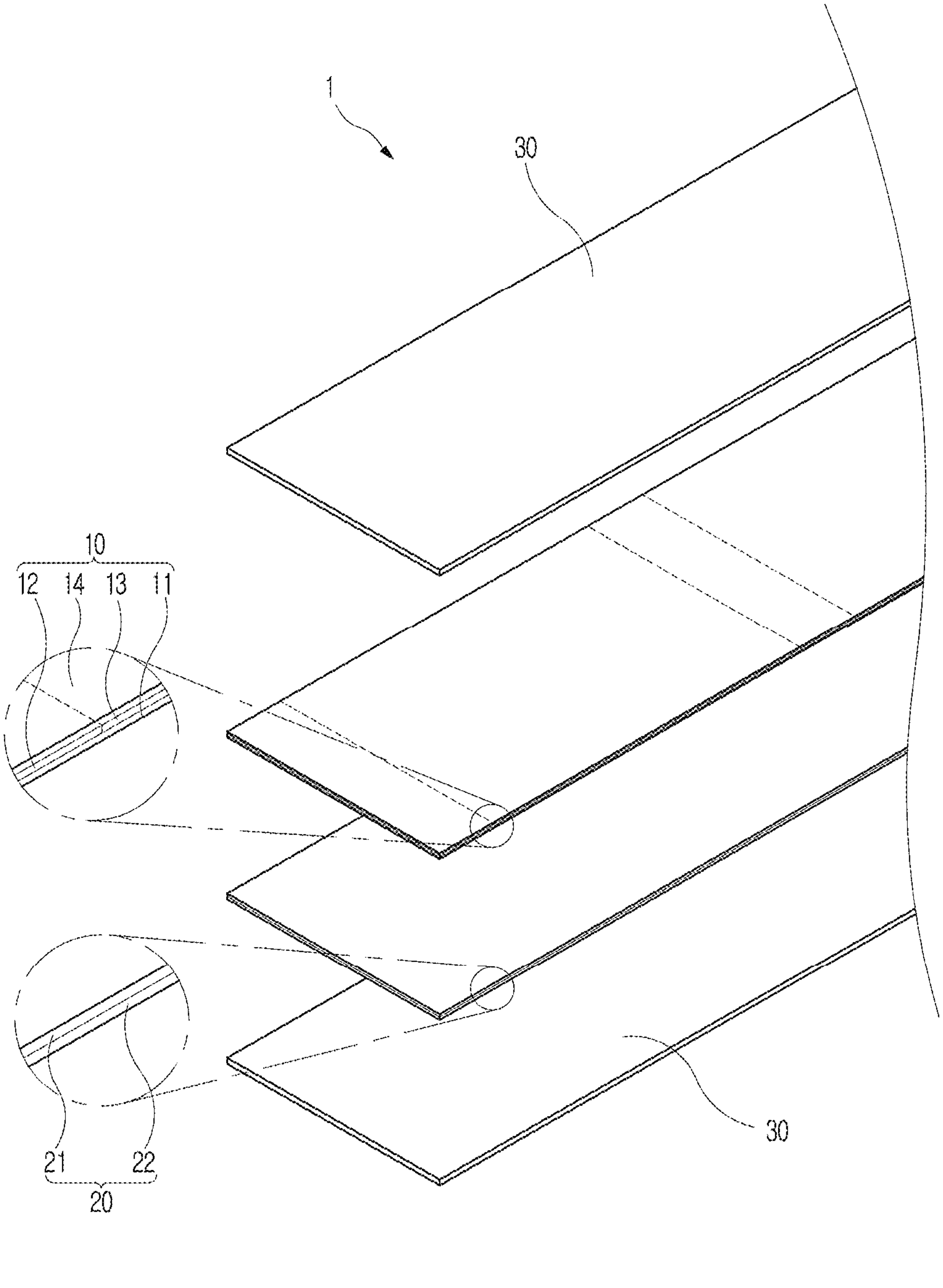
FIG. 3 is an exploded perspective view of a planar heating composite sheet according to an embodiment of the present invention.
Figure 4:
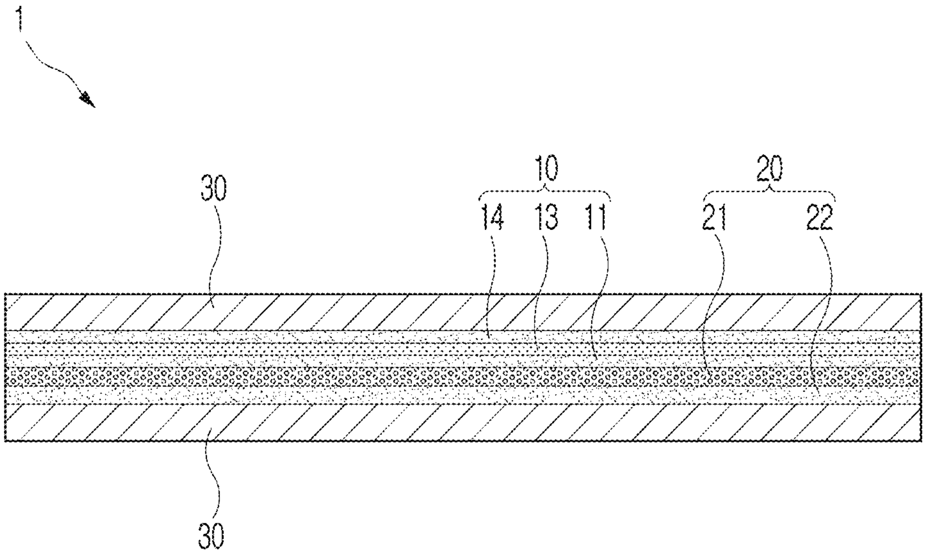
FIG. 4 is a cross-sectional view taken along line A-A' of FIG. 2.

FIG. 2 is a perspective view of a planar heating composite sheet according to an embodiment of the present invention, FIG. 3 is an exploded perspective view of the planar heating composite sheet according to an embodiment of the present invention, and FIG. 4 is a cross-sectional view taken along line A-A' of FIG. 2.

Referring to FIGS. 2 to 4, the planar heating composite sheet 1 according to an embodiment of the present invention includes a planar heating layer 10, a heat insulating layer 20, and a protective layer 30.

The planar heating layer 10 generates heat by electrical resistance upon power supply, and includes a base sheet 11, an electrode 12, a conductive paste 13, and an insulating sheet 14.

The base sheet 11 is made of a synthetic resin material, and provides an area for the electrode 12 and the conductive paste 13 to be coated, and also performs an insulating function to prevent current applied to the electrode or the conductive paste from leaking to the lower portion.

The electrodes 12 provides entrances and exits for the supplied current, and are coated along a width direction of the base sheet 11, with different polarities being alternately arranged at regular intervals along a length direction of the base sheet 11.

The electrode 12 is formed by coating a paste containing silver (Ag) powder on the upper surface of the base sheet 11 and curing the same.

The conductive paste 13 generates heat by electrical resistance upon application of the current, and is entirely coated between a plurality of electrodes 12 on the upper surface of the base sheet 11.

The conductive paste 13 herein includes 20 to 40 parts by weight of amorphous co-polyester resin as a binder, 2.5 to 7.5 parts by weight of carbon nanotubes, and 2.5 to 7.5 parts by weight of carbon nanoplates, and the balance being graphene, silver (Ag) powder, a carbon dispersant and a solvent.

The amorphous co-polyester resin as a binder allows the conductive paste 13 to have regular dispersibility and excellent coating properties, and to maintain adhesion to the base sheet 11.

In particular, the amorphous co-polyester resin imparts tensile stress to the conductive paste 13, and used preferably in an amount between 20 and 40 parts by weight, because sufficient tensile stress is not applied to the conductive paste 13 if it is less than 20 parts by weight, while the conducting function of the conductive paste 13 may not be properly exhibited it exceeds 40 parts by weight.

Carbon nanotubes and carbon nanoplates may be preferably included as conductive materials in an amount of 2.5 to 7.5 parts by weight, respectively, because the conductive function is not properly exhibited if it is less than 2.5 parts by weight, while the tensile stress of the conductive paste 13 applied through the amorphous co-polyester resin is damaged if it exceeds 7.5 parts by weight.

The carbon dispersant is to allow the carbon nanotubes and carbon nanoplates to be regularly dispersed in the conductive paste 13, and combine and uses at least two or more of carboxymethyl cellulose, polystyrene sulfonate, chondroitin sulfate, and hyaluronic acid.

The solvent is to dissolve the amorphous co-polyester resin, and may include alpha-terpineol, butyl cellosolve, ethyl cellosolve, ethyl carbitol, butyl carbitol, ethoxyethyl acetate, butyl acetate, propylene glycol monomethyl ether, γ-butyrolactone, methyl ethyl ketone (methyl ethyl ketone) or combination thereof.

With the conductive paste 13 of the present invention having the composition ratio described above, the tensile stress is applied to the conductive thin film formed by the conductive paste 13 so as to resist the shear force generated by the asphalt concrete or equipment load applied during the snow melting pavement construction of the road and the wheel load applied after construction, and as a result, it is possible to minimize damage of the conductive thin film due to shear force.

The insulating sheet 14 is made of a synthetic resin material and attached to the upper portion of the electrode 12 and the conductive paste 13, and performs an insulation function to prevent current applied to the electrodes or the conductive paste from leaking to the upper portion.

The heat insulating layer 20 is to prevent heat emitted from the planar heating layer 10 from being lost into the ground, and includes a heat insulating sheet 21 attached to a lower portion of the planar heating layer 10 and a protective sheet 22 attached to a lower portion of the heat insulating sheet 21.

Since the planar heating composite sheet 1 of the present invention is constructed at a shallow depth of about 7 to 8 cm from the road surface, the material, structure and thickness of the heat insulating layer 20 are very critical. That is, since the generally used thick heat insulation medium can be easily damaged or broken by the asphalt concrete or equipment load during the construction process, it is necessary to satisfy the requirement for both the high thinness and high heat insulation efficiency at the same time, which is quite difficult.

The heat insulating sheet 21 of the present invention for satisfying the requirement for both the thickness and heat insulation efficiency is constructed such that aerogel is impregnated into a non-woven fabric sheet made of a synthetic resin material, and the heat insulating layer 20 including the protective sheet 22 is formed to have thickness between 1 and 5 mm.

In this case, the aerogel, which has a structure containing 90% or more of fine air internally to provide excellent heat insulation performance to block the heat through convection, conduction, and radiation, can prevent the heat emitted from the planar heating layer 10 from being lost into the ground more efficiently.

Further, the non-woven fabric sheet made of the synthetic resin material is preferably manufactured so as to serve as a frame for distributing the aerogel in a sheet form and have 2 to 20 MPa of tensile stress such that it can resist shear stress generated by asphalt concrete or equipment load applied during snow melting pavement construction and the wheel load applied after construction, thereby preventing the aerogel from being damaged by shear stress.

If the thickness of the heat insulating layer 20 is less than 1 mm, the heat insulating effect is insufficient, and if the thickness is 5 mm or more, the risk of damage due to asphalt concrete or equipment load during construction is increased.

The protective sheet 22 is made of a synthetic resin material and attached to the lower portion of the heat insulating sheet 21, and serves to prevent the fine air contained in the aerogel from escaping to the outside, and also prevent, during construction, asphalt from flowing to the heat insulating sheet 21 and penetrating into the micropores of the aerogel.

The protective layer 30 serves to prevent the planar heating layer 20 and the heat insulating layer 30 from being damaged due to the shear stress generated by the asphalt concrete or equipment load applied during the snow melting pavement construction of the road and the wheel load applied after construction, and is attached to an upper portion of the planar heating layer 20 and to a lower portion of the heat insulating layer 30, respectively.

The protective layer 30 is formed in a structure in which asphalt and rubber are impregnated into the synthetic resin non-woven fabric.

The synthetic resin non-woven fabric is used herein so as to resist the shear stress generated by asphalt concrete or equipment load during construction and the wheel load after construction through tensile stress as described above.

Further, asphalt and rubber are impregnated so as to ensure sufficient adhesion to the asphalt concrete during construction.

As described above, by applying the planar heating composite sheet 1 according to an embodiment of the present invention to the snow melting pavement of roads, it is possible to significantly improve the snow melting efficiency, and subsequently reduce power consumption significantly, because the heat emitted from the planar heating layer is prevented from being lost into the ground more efficiently by the heat insulating sheet having a structure in which the non-woven fabric sheet made of the synthetic resin material is impregnated with aerogel.

Further, because the heat insulating sheet of the heat insulating layer and the base of the protective layer are made of the non-woven fabric sheet of the synthetic resin material, it is possible to resist the shear force generated by the asphalt concrete or equipment load applied during snow melting pavement construction and the wheel load applied after construction through the tensile stress of the non-woven fabric sheet, thereby preventing damages more efficiently.

Therefore, the possibility of requiring re-construction is lowered, thus reducing cost of re-construction, and durability is also improved remarkably.

Figure 5:
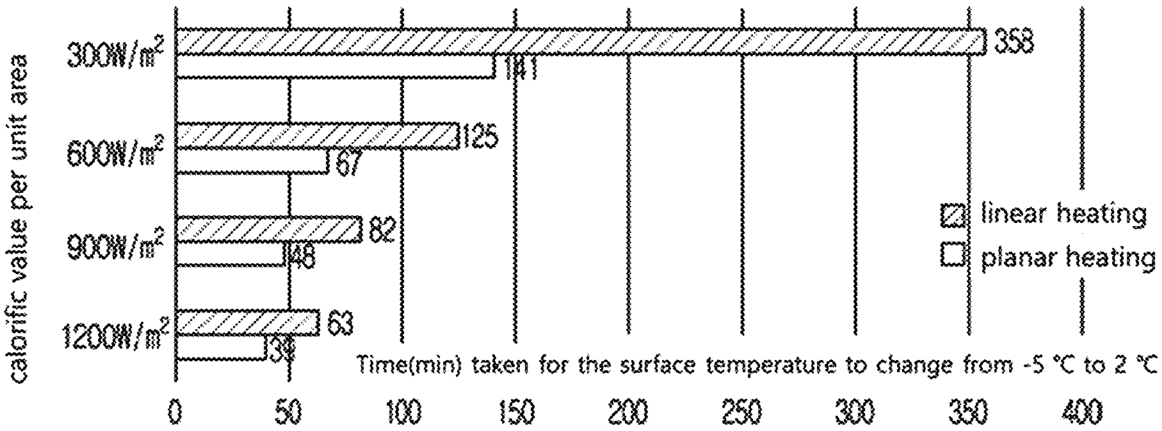
FIG. 5 is a graph showing a comparison of heating rate between a snow melting pavement with the conventional linear heating method and a snow melting pavement with the planer heating composite sheet according to an embodiment of the present invention buried therein.

FIG. 5 is a graph showing a comparison of heating rate between a snow melting pavement with the conventional linear heating method and a snow melting pavement with the planer heating composite sheet according to an embodiment of the present invention buried therein.

Referring to FIG. 5, in the case of the snow melting pavement of the conventional linear heating method, the time taken for the surface temperature to change from −5° C. to 2° C. is 358 minutes at 300 $W/m^2$, 125 minutes at 600 $W/m^2$, 82 minutes at 900 $W/m^2$, and 63 minutes at 1200 $W/m^2$, respectively.

Meanwhile, in the case of the snow melting pavement with the planar heating composite sheet according to the embodiment of the present invention buried therein, the time taken to change from −5° C. to 2° C. is 141 minutes at 300 $W/m^2$, 67 minutes at 600 $W/m^2$, 48 minutes at 900 $W/m^2$, and 39 minutes at 1200 $W/m^2$, respectively. It is obvious that the planar heating composite sheet according to the embodiment has remarkably excellent snow melting efficiency and also significantly reduces power consumption.

Figure 6A:
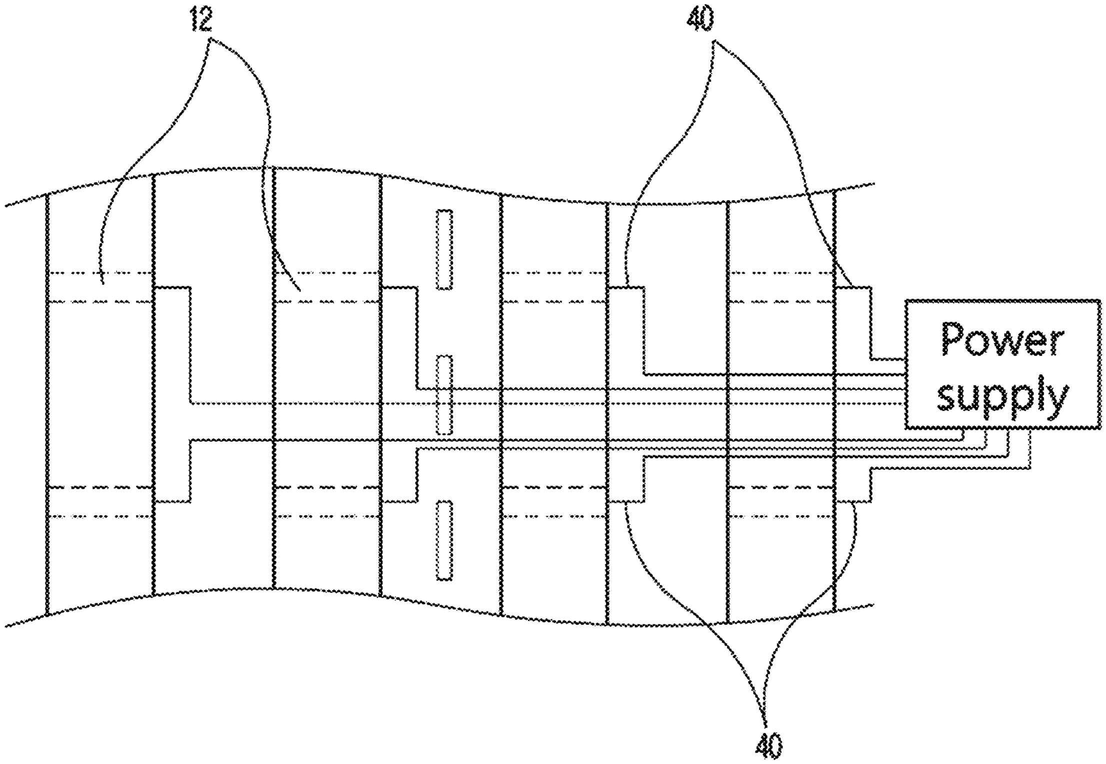
FIGS. 6A and 6B are views provided to explain a connection structure between electrodes of planar heating composite sheets according to an embodiment of the present invention.
Figure 6B:
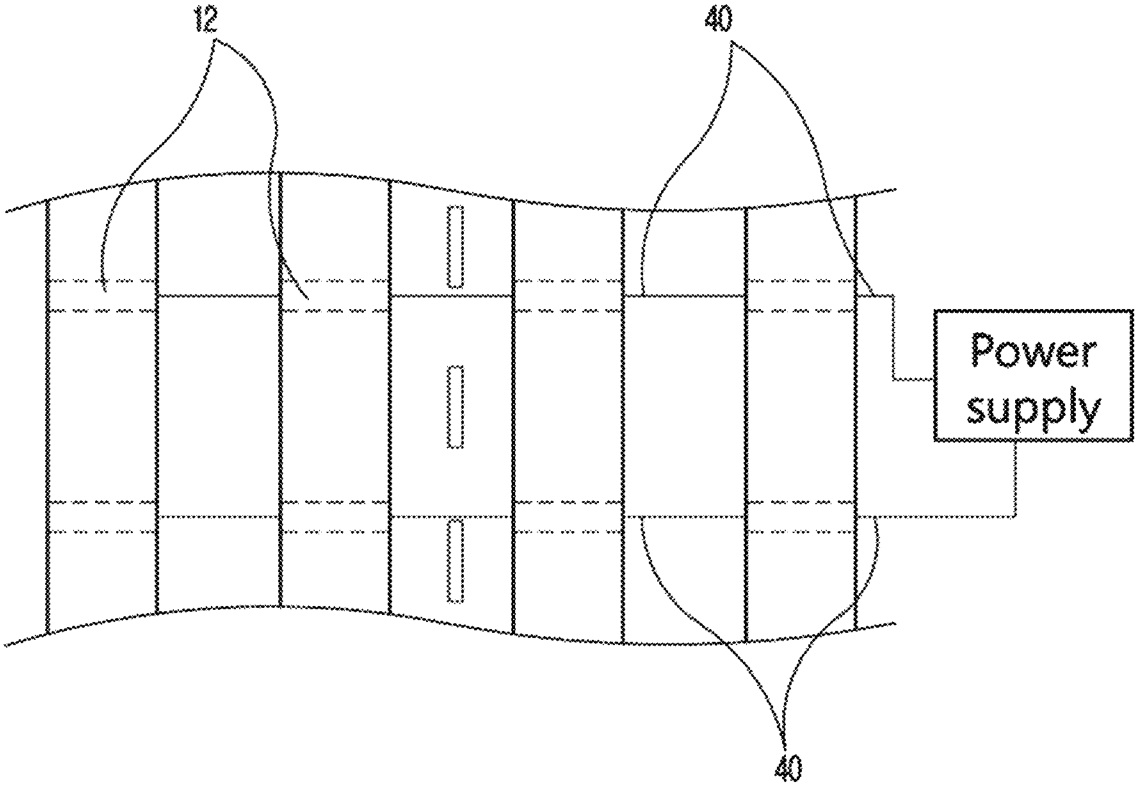

FIGS. 6A and 6B are views provided to explain a connection structure between the electrodes of the planar heating composite sheets according to an embodiment of the present invention.

During the snow melting pavement construction of the road, the planar heating composite sheet 1 described above is arranged in parallel along the width direction of the road, as shown in FIGS. 6A and 6B.

Further, the electrodes 12 having different polarities placed along the length direction of each planar heating composite sheet 1 are connected to a power supply means through conductive wires.

In the related art, as shown in FIG. 6A, a method of connecting each electrode 12 of each planar heating composite sheet 1 to the power supply means through conductive wires 40 is used.

However, according to the related method, because it is necessary to connect the electrodes 12 to the power supply means through the conductive wire 40 one by one, the installation work is cumbersome and the number of conductive wires 40 is increased, thus taking a considerable amount of time for the alignment.

Further, since each conductive wire 40 is installed across the area where the planar heating composite sheet 1 is placed, i.e., the area where the wheel contacts, there is a problem that the conductive wire 40 may be disconnected due to the wheel load.

For the above reasons, the present invention employs a method of directly connecting the electrodes 12 having the same polarity of each adjacent planar heating composite sheet 1 through the conductive wires 40, and connecting only one of the interconnected electrodes having the same polarity to the power supply means, as shown in FIG. 6B.

Through the above structure, the present invention significantly reduces the length of the conductive wires 40 compared to the related art, and provides easy installation by way of connecting adjacent electrodes, and requires no further alignment work because the conductive wires 40 do not overlap each other.

Further, since the conductive wire 40 is installed away from a region where the wheel load is applied, the problem that the conductive wire 40 is disconnected due to the wheel load does not occur.

Figure 7:
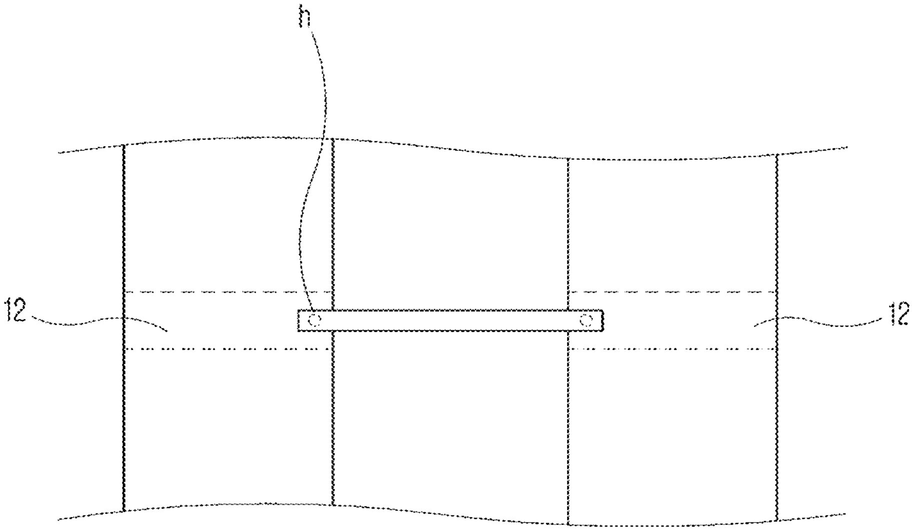
FIG. 7 illustrates in detail a connection structure between electrodes of planar heating composite sheets according to an embodiment of the present invention.

FIG. 7 illustrates in detail the connection structure between the electrodes of the planar heating composite sheets according to an embodiment of the present invention.

As shown in FIG. 7, in the connection structure between electrodes of the planar heating composite sheets according to an embodiment of the present invention, there is formed a through hole (h) penetrating the insulating sheet and the protective layer disposed on an upper portion of an edge of each electrodes 12 in the adjacent planar heating composite sheets 1, and both ends of a strip-shaped conductive wire 40 are connected to each electrodes 12 exposed through the through hole H by spot welding.

Although the present invention has been described with respect to the above preferred embodiments, it is possible to make various modifications and variations without departing from the spirit and scope of the invention. Accordingly, the appended claims will cover such modifications and variations as falling within the subject matter of this invention.

The invention claimed is:

1. A planar heating composite sheet, comprising:

a planar heating layer comprising: a base sheet made of a synthetic resin material and having a predetermined width and length; a plurality of electrodes coated to an upper surface of the base sheet along a width direction of the base sheet, with different polarities being alternately arranged at regular intervals along a length direction of the base sheet; a conductive paste coated entirely between the plurality of electrodes on the upper surface of the base sheet and generating heat by electrical resistance; and an insulating sheet made of a synthetic resin material and attached to an upper portion of the conductive paste; and a heat insulating layer including a heat insulating sheet attached to a lower portion of the planar heating layer and including a non-woven fabric impregnated with aerogel; and a protective sheet made of a synthetic resin material and attached to a lower part of the non-woven fabric sheet.

2. The planar heating composite sheet of claim 1, wherein a thickness of the heat insulating layer is 1 to 5 mm.

3. The planar heating composite sheet of claim 1, wherein the conductive paste includes 20 to 40 parts by weight of amorphous co-polyester resin, 2.5 to 7.5 parts by weight of carbon nanotubes, 2.5 to 7.5 parts by weight of carbon nanoplates, and the balance being graphene, silver (Ag) powder, a carbon dispersant and a solvent.

4. The planar heating composite sheet of claim 3, wherein the carbon dispersant uses, in combination, at least two or more of carboxymethyl cellulose, polystyrene sulfonate, chondroitin sulfate, and hyaluronic acid.

5. The planar heating composite sheet of claim 1, further comprising a protective layer attached to an upper portion of the planar heating layer and to a lower portion of the heat insulating layer, and including a non-woven fabric of synthetic resin material impregnated with asphalt and rubber.

6. The planar heating composite sheet of claim 1, wherein, during a snow melting pavement construction of a road, the electrodes of the same polarity of each adjacent planar heating layer are directly connected with each other with a conductive wire.

* * * * *